(12) United States Patent
Preston et al.

(10) Patent No.: US 7,681,448 B1
(45) Date of Patent: *Mar. 23, 2010

(54) SYSTEM AND METHOD FOR ALIGNING SENSORS ON A VEHICLE

(75) Inventors: Dan Alan Preston, Bainbridge Island, WA (US); David Olmstead, Bainbridge Island, WA (US)

(73) Assignee: Medius, Inc., Bainbridge Island, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/024,058

(22) Filed: Jan. 31, 2008

Related U.S. Application Data (63) Continuation of application No. 10/985,577, filed on Nov. 9, 2004, now Pat. No. 7,337,650.

(51) Int. Cl.
*G01P 1/02* (2006.01)
*G01P 21/00* (2006.01)

(52) U.S. Cl. .................... 73/432.1; 73/1.38

(58) Field of Classification Search .............. 73/1.38, 73/432.1; 356/399, 400, 614, 620, 623, 138, 356/139.03, 139.1, 140, 141.1, 141.2, 147, 356/3.01, 3.1, 3.13–3.14; 250/330
See application file for complete search history.

(56) References Cited

U.S. PATENT DOCUMENTS

| | | | |
|---|---|---|---|
| 2,995,318 A | 8/1961 | Cocharo | 244/3.16 |
| 4,303,978 A | 12/1981 | Shaw et al. | 701/220 |
| 4,528,563 A | 7/1985 | Takeuchi | 340/903 |
| 4,591,976 A | 5/1986 | Webber et al. | 714/20 |
| 4,829,434 A | 5/1989 | Karmel et al. | 701/59 |
| 4,907,159 A | 3/1990 | Mauge et al. | 701/117 |
| 5,008,678 A | 4/1991 | Herman | 342/158 |
| 5,031,330 A | 7/1991 | Stuart | 33/366.12 |
| 5,045,937 A | 9/1991 | Myrick | 348/144 |

(Continued)

FOREIGN PATENT DOCUMENTS

DE 3125151 1/1983

(Continued)

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13.

(Continued)

*Primary Examiner*—Hezron Williams
*Assistant Examiner*—Tamiko D Bellamy
(74) *Attorney, Agent, or Firm*—Stolowitz Ford Cowger LLP (57) ABSTRACT

A vehicle sensor system consisting of video, radar, ultrasonic or laser sensors, oriented to obtain a 360 degree view around the vehicle for the purpose of developing a situation or scene awareness. The sensors may or may not have overlapping field of views, or support the same applications, but data will be shared by all. Orientation of the sensor to the vehicle body coordinates is critical in order to accurately assess threat and respond. This system describes methods based on measuring force and rotation on each sensor and computing a dynamic alignment to first each other, then second to the vehicle.

13 Claims, 9 Drawing Sheets

Alignment of sensors and the vehicle

U.S. PATENT DOCUMENTS

| | | | |
|---|---|---|---|
| 5,111,401 A | 5/1992 | Everett, Jr. et al. | 701/24 |
| 5,115,245 A | 5/1992 | Wen et al. | 342/175 |
| 5,245,909 A | 9/1993 | Corrigan et al. | 89/41.9 |
| 5,303,297 A | 4/1994 | Hillis | 455/406 |
| 5,339,086 A | 8/1994 | DeLuca et al. | 342/371 |
| 5,341,301 A | 8/1994 | Shirai et al. | 701/215 |
| 5,438,361 A | 8/1995 | Coleman | 348/208.7 |
| 5,471,214 A | 11/1995 | Faibish et al. | 342/70 |
| 5,506,963 A | 4/1996 | Ducateau et al. | 718/107 |
| 5,532,706 A | 7/1996 | Reinhardt et al. | 343/778 |
| 5,552,773 A | 9/1996 | Kuhnert | 340/573.1 |
| 5,581,462 A | 12/1996 | Rogers | 701/3 |
| 5,585,798 A | 12/1996 | Yoshioka et al. | 342/70 |
| 5,617,085 A | 4/1997 | Tsutsumi et al. | 340/903 |
| 5,646,612 A | 7/1997 | Byon | 340/903 |
| 5,749,060 A | 5/1998 | Graft et al. | 340/439 |
| 5,761,320 A | 6/1998 | Farinelli et al. | 381/81 |
| 5,786,998 A | 7/1998 | Neeson et al. | 701/35 |
| 5,872,508 A | 2/1999 | Taoka | 340/436 |
| 5,907,293 A | 5/1999 | Tognazzini | 340/903 |
| 5,915,214 A | 6/1999 | Reece et al. | 455/406 |
| 5,943,427 A | 8/1999 | Massie et al. | 381/17 |
| 5,964,822 A * | 10/1999 | Alland et al. | 701/301 |
| 5,966,658 A | 10/1999 | Kennedy et al. | 455/426.1 |
| 5,969,598 A | 10/1999 | Kimura | 340/436 |
| 5,977,906 A * | 11/1999 | Ameen et al. | 342/174 |
| 5,983,092 A | 11/1999 | Whinnett et al. | 455/406 |
| 5,983,161 A | 11/1999 | Lemelson et al. | 701/301 |
| 6,009,330 A | 12/1999 | Kennedy et al. | 455/445 |
| 6,028,537 A | 2/2000 | Suman et al. | 340/988 |
| 6,028,548 A | 2/2000 | Farmer | 342/70 |
| 6,061,709 A | 5/2000 | Bronte | 718/103 |
| 6,097,285 A | 8/2000 | Curtin | 340/436 |
| 6,128,608 A | 10/2000 | Barnhill | 706/16 |
| 6,148,261 A | 11/2000 | Obradovich et al. | 701/208 |
| 6,161,071 A | 12/2000 | Shuman et al. | 701/48 |
| 6,163,711 A | 12/2000 | Juntunen et al. | 455/557 |
| 6,166,627 A | 12/2000 | Reeley | 340/426.25 |
| 6,167,253 A | 12/2000 | Farris et al. | 455/412.2 |
| 6,175,782 B1 | 1/2001 | Obradovich et al. | 701/1 |
| 6,181,994 B1 | 1/2001 | Colson et al. | 701/33 |
| 6,182,006 B1 | 1/2001 | Meek | 701/200 |
| 6,202,027 B1 | 3/2001 | Alland et al. | 701/301 |
| 6,203,366 B1 | 3/2001 | Muller et al. | 439/561 |
| 6,204,804 B1 | 3/2001 | Andersson | 342/113 |
| 6,226,389 B1 | 5/2001 | Lemelson et al. | 382/104 |
| 6,240,365 B1 | 5/2001 | Bunn | 701/213 |
| 6,243,450 B1 | 6/2001 | Jansen et al. | 379/144.01 |
| 6,252,544 B1 | 6/2001 | Hoffberg et al. | 342/357.1 |
| 6,275,231 B1 | 8/2001 | Obradovich et al. | 345/156 |
| 6,292,109 B1 | 9/2001 | Murano et al. | 340/903 |
| 6,292,747 B1 | 9/2001 | Amro et al. | 701/213 |
| 6,294,987 B1 | 9/2001 | Matsuda et al. | 340/439 |
| 6,297,732 B2 | 10/2001 | Hsu et al. | 340/439 |
| 6,298,302 B2 | 10/2001 | Walgers et al. | 701/209 |
| 6,326,903 B1 | 12/2001 | Gross et al. | 340/988 |
| 6,327,536 B1 | 12/2001 | Tsuji et al. | 701/301 |
| 6,362,748 B1 | 3/2002 | Huang | 340/901 |
| 6,374,286 B1 | 4/2002 | Gee et al. | 718/108 |
| 6,389,340 B1 | 5/2002 | Rayner | 701/35 |
| 6,405,132 B1 | 6/2002 | Breed et al. | 701/301 |
| 6,408,174 B1 | 6/2002 | Steijer | 455/407 |
| 6,417,782 B1 | 7/2002 | Darnall | 340/905 |
| 6,429,789 B1 | 8/2002 | Kiridena et al. | 340/905 |
| 6,429,812 B1 | 8/2002 | Hoffberg | 342/357.1 |
| 6,445,308 B1 | 9/2002 | Koike | 340/902 |
| 6,452,484 B1 | 9/2002 | Drori | 340/426.13 |
| 6,484,080 B2 | 11/2002 | Breed | 701/36 |
| 6,496,689 B1 | 12/2002 | Keller et al. | 455/406 |
| 6,505,100 B1 | 1/2003 | Stuempfle et al. | 701/1 |
| 6,515,595 B1 | 2/2003 | Obradovich et al. | 340/905 |
| 6,522,875 B1 | 2/2003 | Dowling et al. | 455/414.3 |
| 6,622,083 B1 | 9/2003 | Knockeart et al. | 701/202 |
| 6,778,924 B2 * | 8/2004 | Hanse | 702/88 |
| 6,782,315 B2 | 8/2004 | Lu et al. | 701/45 |
| 7,006,950 B1 | 2/2006 | Greiffenhagen et al. | 703/2 |
| 7,024,363 B1 | 4/2006 | Comerford et al. | 704/270 |
| 7,079,993 B2 | 7/2006 | Stephenson et al. | 703/2 |
| 7,120,129 B2 | 10/2006 | Ayyagari et al. | 370/255 |
| 7,187,947 B1 | 3/2007 | White et al. | 455/556.1 |
| 7,257,426 B1 | 8/2007 | Witkowski et al. | 455/569.2 |
| 7,343,160 B2 | 3/2008 | Morton | 455/444 |
| 2001/0008992 A1 | 7/2001 | Saito et al. | 701/301 |
| 2001/0009855 A1 | 7/2001 | L' Anson | 455/445 |
| 2001/0018639 A1 | 8/2001 | Bunn | 701/214 |
| 2001/0022927 A1 | 9/2001 | Mattio et al. | 414/331.03 |
| 2001/0041556 A1 | 11/2001 | Laursen et al. | 455/406 |
| 2001/0048749 A1 | 12/2001 | Ohmura et al. | 381/86 |
| 2001/0051853 A1 | 12/2001 | Evans et al. | 701/301 |
| 2002/0012329 A1 | 1/2002 | Atkinson et al. | 370/330 |
| 2002/0087886 A1 | 7/2002 | Ellis | 726/11 |
| 2002/0119766 A1 | 8/2002 | Bianconi et al. | 455/406 |
| 2002/0142759 A1 | 10/2002 | Newell et al. | 455/414.1 |
| 2002/0144010 A1 | 10/2002 | Younis et al. | 719/314 |
| 2002/0177429 A1 | 11/2002 | Watler et al. | 455/405 |
| 2002/0198925 A1 | 12/2002 | Smith et al. | 718/104 |
| 2003/0004633 A1 | 1/2003 | Russell et al. | 701/96 |
| 2003/0009270 A1 | 1/2003 | Breed | 701/29 |
| 2003/0011509 A1 | 1/2003 | Honda | 342/70 |
| 2003/0060188 A1 | 3/2003 | Gidron et al. | 455/406 |
| 2003/0065432 A1 | 4/2003 | Shuman et al. | 701/48 |
| 2003/0110113 A1 | 6/2003 | Martin | 705/36 R |
| 2003/0201365 A1 | 10/2003 | Nelson | 244/118.5 |
| 2003/0201929 A1 * | 10/2003 | Lutter et al. | 342/52 |
| 2004/0149036 A1 | 8/2004 | Foxlin et al. | 73/511 |
| 2004/0164228 A1 * | 8/2004 | Fogg et al. | 250/208.1 |
| 2005/0080543 A1 | 4/2005 | Lu et al. | 701/70 |
| 2007/0115897 A1 | 5/2007 | Chen et al. | 370/338 |

FOREIGN PATENT DOCUMENTS

| | | |
|---|---|---|
| DE | 3125161 | 1/1983 |
| EP | 0441576 | 8/1991 |
| EP | 1355128 | 10/2003 |
| JP | 2000207691 | 7/2000 |
| WO | 9624229 | 8/1996 |
| WO | 9908436 | 2/1999 |
| WO | 9957662 | 11/1999 |
| WO | 9965183 | 12/1999 |
| WO | 0040038 | 6/2000 |
| WO | 0130061 | 4/2001 |
| WO | 0158110 | 8/2001 |

OTHER PUBLICATIONS

Ada 95 Transition Support—Lessons Learned, Sections 3, 4, and 5, CACI, Inc. -Federal, Nov. 15, 1996, 14 pages.

Boeing News Release, "Boeing Demonstrates JSF Avionics Multi-Sensor Fusion", Seattle, WA, May 9, 2000, pp. 1-2.

Boeing Statement, "Chairman and CEO Phil Condit on the JSF Decision", Washington, D.C., Oct. 26, 2001, pp. 1-2.

Bluetooth Specification version 1.1: Feb. 22, 2001.

Counterair: The Cutting Edge, Ch. 2 "The Evolutionary Trajectory The Fighter Pilot-Here to Stay?" AF2025 v3c8-2, Dec. 1996, pp. 1-7.

Counterair: The Cutting Edge, Ch. 4 "The Virtual Trajectory Air Superiority without an "Air" Force?" AF2025 v3c8-4, Dec. 1996, pp. 1-12.

Green Hills Software, Inc., "The AdaMULTI 2000 Integrated Development Environment," Copyright 2002, 7 pages.

H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, pp. 1-6.

Hitachi Automated Highway System (AHS), Automotive Products, Hitachi, Ltd., Copyright 1994-2002, 8 pages.

ISIS Project: Sensor Fusion, Linkoping University Division of Automatic Control and Communication Systems in cooperation with SAAB (Dynamics and Aircraft), 18 pages.

J. Takezaki, N. Ueki, T. Minowa, H. Kondoh, "Support System for Safe Driving—A Step Toward ITS Autonomous Driving—", Hitachi Review, vol. 49, No. 3, 2000, pp. 1-8.

Joint Strike Fighter Terrain Database, ets-news.com "Simulator Solutions" 2002, 3 pages.

Luttge, Karsten; "E-Charging API: Outsource Charging to a Payment Service Provider"; IEEE; 2001 (pp. 216-222).

M. Chantler, G. Russel, and R. Dunbar, "Probabilistic Sensor Fusion for Reliable Workspace Sensing", pp. 1-14.

MSRC Redacted Proposal, 3.0 Architecture Development, pp. 1-43.

Powerpoint Presentation by Robert Allen—Boeing Phantom Works entitled "Real-Time Embedded Avionics System Security and COTS Operating Systems", Open Group Real-Time Forum, Jul. 18, 2001, 16 pages.

Product description of Raytheon Electronic Systems (ES), Copyright 2002, pp. 1-2.

Product description of Raytheon RT Secure, "Development Environment", Copyright 2001, pp. 1-2.

Product description of Raytheon RT Secure, "Embedded Hard Real-Time Secure Operating System", Copyright 2000, pp. 1-2.

Product description of Raytheon RT Secure, Copyright 2001, pp. 1-2.

S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.

TNO FEL Annual Review 1998: Quality works, 16 pages.

Vehicle Dynamics Lab, University of California, Berkeley, funded by BMW, current members: D. Caveney and B. Feldman, "Adaptive Cruise Control", 17 pages.

Specification of the Bluetooth System v1.0.B Dec. 1, 1999.

Specification of the Bluetooth System v1.1 Feb. 22, 2001.

MyGig.

Embedded Bluetooth Lisbon-Seattle Jan. 23, 2008.

AMIC. Architecture specification release 1, 2001.

Bluetooth hands-free profile 1.5—Nov. 25, 2005.

Bluetooth advance audio distribution profile specification—May 22, 2003.

Bluetooth audio/video remote control profile—May 22, 2003.

* cited by examiner

Figure 1: Alignment of sensors and the vehicle

Figure 2: Pitch misalignment Angle Computation

Figure 3: Yaw Misalignment Angle Computation

Figure 4: Roll misalignment Angle Computation

Figure 5: Optical Image – Level

Figure 6: Center of Hood, level, magnified 12 times

Figure 7: Optical Image – Banked left

Figure 8: Center of Hood, banked left, magnified 8 times

Figure 9: Optical Image – Yaw left

Figure 10: Alignment where all sensors have micro-inertials

Figure 11: Alignment using micro-inertials and an optical sensor

Figure 12: Alignment where all of the sensors are optical

Figure 13: Alignment where the sensors are on a common platform

SYSTEM AND METHOD FOR ALIGNING SENSORS ON A VEHICLE

RELATED FILINGS

This application is a continuation application of Ser. No. 10/985,577 filed Nov. 9, 2004 now U.S. Pat. No. 7,337,650 which is incorporated herein by reference.

This application incorporates by reference U.S. Pat. Nos. 6,629,033, Issued Sep. 30, 2003 Titled—OPEN COMMUNICATION SYSTEM FOR REAL-TIME MULTIPROCESSOR APPLICATIONS, 6,771,208, Issued Aug. 3, 2004 Titled—MULTI SENSOR SYSTEM, and U.S. patent application Ser. No. 09/841,915, filed Apr. 24, 2001 entitled: METHOD AND APPARATUS FOR DYNAMIC CONFIGURATION OF MULTIPROCESSOR SYSTEM.

REFERENCES CITED

U.S. Patent Documents

U.S. Pat. No. 5,245,909 May 7, 1990; Title: Automatic Sensor Alignment; Inventors: Corrigan; John D. (Bridgeton, Mo.); Simmons, Jr.; Dennis E. (St. Louis, Mo.); Berg; Robert L. (St. Louis, Mo.); Assignee: McDonnell Douglas Corporation (MD)

U.S. Pat. No. 6,202,027 Mar. 13, 2001; Title: Automatic curve sensor calibration method for an automotive CW/ICC system; Automatic curve sensor calibration method for an automotive CW/ICC system U.S. Pat. No. 5,031,330 Jul. 16, 1991; Title: Electronic Boresight; Inventors: Stuart; Kenneth (Los Altos Hills, Calif.)

Assignee: Kaiser Aerospace & Electronics Corporation (Oakland, Calif.)

Other References

Product description of Raytheon RT Secure, "Embedded Hard Real-Time Secure Operating System", Copyright 2000, pp. 1-2.

Product description of Raytheon RT Secure, Copyright 2001, pp. 1-2.

Product description of Raytheon RT Secure, "Development Environment", Copyright 2001, pp. 1-2.

Product description of Raytheon Electronic Systems (ES), Copyright 2002, pp. 1-2.

H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, pp. 1-6.

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13.

J. Takezaki, N. Ueki, T. Minowa, H. Kondoh, "Support System for Safe Driving—A Step Toward ITS Autonomous Driving-", Hitachi Review, vol. 49, No. 3, 2000, pp. 1-8.

S. G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, N.C., 1997, pp. 1-5.

M. Chantler, G. Russel, and R. Dunbar, "Probabilistic Sensor Fusion for Reliable Workspace Sensing", pp. 1-14.

ISIS Project: Sensor Fusion, Linkoping University Division of Automatic Control and Communication Systems in cooperation with SAAB (Dynamics and Aircraft), 18 pp.

Hitachi Automated Highway System (AHS), Automotive Products, Hitachi, Ltd., Copyright 1994-2002, 8 pages.

Vehicle Dynamics Lab, University of California, Berkeley, funded by BMW, current members: D. Caveney and B. Feldman, "Adaptive Cruise Control", 17 pages.

Counterair: The Cutting Edge, Ch. 2 "The Evolutionary Trajectory The Fighter Pilot-Here to Stay?" AF2025 v3c8-2, December 1996, pp. 1-7.

Counterair: The Cutting Edge, Ch. 4 "The Virtual Trajectory Air Superiority without an "Air" Force?" AF2025 v3c8-4, December 1996, pp. 1-12.

TNO FEL Annual Review 1998: Quality works, 16 pages.

Boeing News Release, "Boeing Demonstrates JSF Avionics Multi-Sensor Fusion", Seattle, Wash., May 9, 2000, pp. 1-2.

Ada 95 Transition Support—Lessons Learned, Sections 3, 4, and 5, CACI, Inc.-Federal, Nov. 15, 1996, 14 pages.

Joint Strike Fighter Terrain Database, ets-news.com "Simulator Solutions" 2002, 3 pages.

MSRC Redacted Proposal, 3.0 Architecture Development, pages 1-43.

Powerpoint Presentation by Robert Allen—Boeing Phantom Works entitled "Real-Time Embedded Avionics System Security and COTS Operating Systems", Open Group Real-Time Forum, Jul. 18, 2001, 16 pages.

Green Hills Software, Inc., "The AdaMULTI 2000 Integrated Development Environment", Copyright 2002, 7 pages.

BACKGROUND

Next generation automotive systems such as Lane Departure Warning (LDW), Collision Avoidance (CA), Blind Spot Detection (BSD) or Adaptive Cruise Control (ACC) systems will require target information from multiple sensors including a new class of sensor such as radar, image or laser, similar to those found on advanced tactical fighter aircraft. For example, one sensor may be located on the front bumper of the vehicle and obtains range and azimuth information about vehicles and stationary objects in front of the vehicle. Another sensor may be located on the dash of the vehicle and obtains image information about vehicles and stationary objects in front of the vehicle. Another sensor may be located on the side of the vehicle and obtains either range and azimuth data or image data in order to determine velocity and track information on vehicles that pass the vehicle. These new systems must take all of the information from the multiple sensors on the vehicle and compute an accurate picture of the moving objects around the vehicle; this is known as kinematic state of the targets, or Situation Awareness (SA). To do this the Situation Awareness Platform (SAP) must accurately align the sensors to each other so that information about a target from one sensor can be used with information about the target from a different sensor. This is called Sensor Fusion (SF), this is necessary for the SAP to get an optimal kinematic state of the targets around the vehicle in order to assess threat. The sensors must also be aligned to the body of the vehicle so that the SAP can determine the position and velocity of the target with respect to the vehicle; this is called Navigation Fusion (NF).

One method of aligning the sensors to each other and to the vehicle is to use mechanical and optical instruments, such as auto-collimators and laser boresight tools, during the production of the vehicle. This technique is not only costly, but would be required if a sensor were repaired or replaced after production. An alignment procedure would have to be performed again in order to assure the safety critical systems were reporting accurately. Also as the vehicle goes through normal wear and tear the sensors would start to become misaligned and may not be noticed by the operator. This means that the data from the sensors would not correlate with each other and the vehicle reference frame until the sensors were aligned again. Again, this would be costly to the vehicle operator and until performed, the SAP may not provide accurate data. Therefore, a method to align the sensors to each other and to the vehicle without the use of sophisticated optical tools is required. This patent addresses this problem by describing methods that can be used to align the sensors to each other and to the vehicle that do not require external alignment equipment.

In a discussion of Prior Art, U.S. Pat. No. 5,245,909, Automatic Sensor Alignment, relates to systems for maintaining alignment-sensitive aircraft-borne avionics and weapons sensors in precise alignment. It further relates to methods for precisely aligning sensitive avionics for weapons system instrumentation, which is subject to vibrations causing misalignment. Whereas this disclosure relates to methods and systems that support advanced automotive systems not described in the prior art. A second key difference is the reliance on sensor data from the vehicle as part of the alignment method. Another difference is using image sensors with elements of the vehicle in the field of view of the imager and employing optical methods for determining changes to the alignment with respect to the vehicle and vehicle reference frame, then applying a compensation based on the misalignment angle measured. Finally, this system described herein does not require a reliance on boresighting and aligning any sensor to achieve a vehicle reference frame.

U.S. Pat. No. 6,202,027, Automatic Curve Sensor Calibration, describes an improved system for accurately determining the travel path of a host vehicle and the azimuth angle of a target vehicle through an automatic calibration that detects and compensates for misalignment and curve sensor drift. The difference is a reliance on observed objects and track file generation and subsequent changes to the track files over time. Whereas this patent teaches methods of alignment based force vectors, rotational rates or optically measured changes with respect to the vehicle reference frame. Essentially all observed objects are compensated for misalignment error on the observing vehicle.

U.S. Pat. No. 5,031,330, Electronic Boresight, teaches that pairs of level sensing devices can be used in a method that aligns plane surfaces to one another by tilting platforms equal to the amount misalignment measured to adjust the sensor azimuth. Whereas this patent teaches that the sensors are rigidly mounted to the vehicle and correction to misalignment is done by compensation values observed with respect to the vehicle reference frame.

SUMMARY OF THE INVENTION

A vehicle sensor system configured to gather sensory data 360 degrees around the vehicle, comprises sensors for gathering data such as: range (e.g. ultrasonic); range and azimuth (e.g. laser and/or radar); images (e.g. optical and/or thermal). The vehicle has sensors that align and establish a vehicle reference frame by measuring body yaw, pitch and roll rates as well as acceleration along the 3 axes of the vehicle. The imaging sensors that have a clear view of body mold lines, like hood or rear deck, will align themselves to the vehicle reference frame, those sensors that can not align using optical methods are aligned to the vehicle using accelerometers and rate sensors by reading the inertial acceleration or angular rotation to align themselves to each other. An Integrated Computing Platform (ICP) hosts the SAP software that maintains complete system alignment by determining differences in alignment and applying or updating a compensation value with respect to the vehicle body coordinates resulting in a dynamically boresighted system.

DETAILED DESCRIPTION

Figure 1:
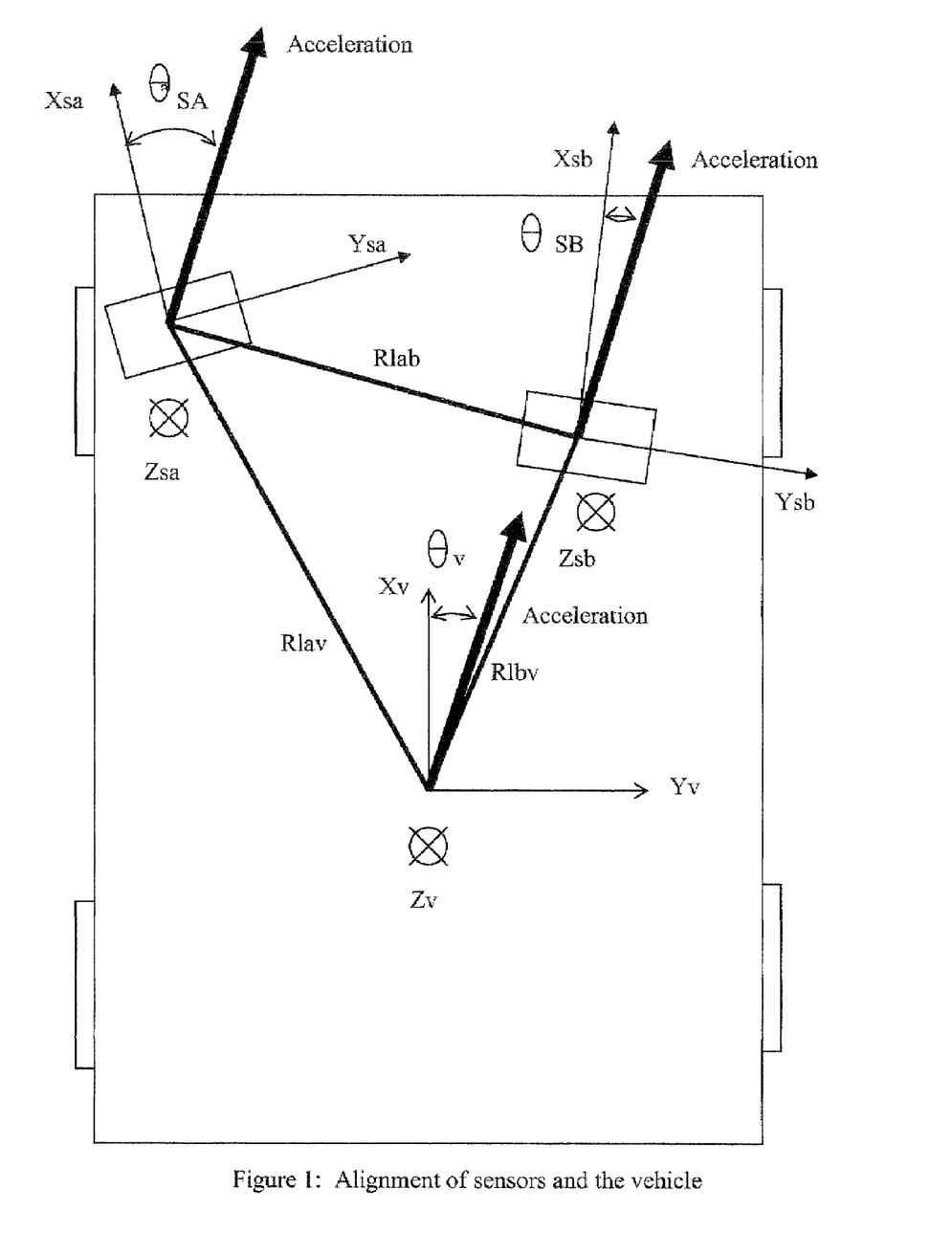
FIG. 1 is a diagram showing how a common inertial acceleration is sensed by accelerometers on each sensor and can be used to align the sensor coordinate frames.

One method is to attach three axis accelerometers to each sensor and to the vehicle and use gravity and the acceleration of the vehicle, which will be sensed by the accelerometers, to align the sensor axes to each other and to the vehicle. Information from the vehicle that is available on the Car Area Network (CAN) bus will also be used to perform the calculation of the misalignment angles. FIG. 1 shows in two dimensions the relation between sensor A frame, sensor B frame and the vehicle body reference frame. There are two accelerometers that sense acceleration in the X and Y axes of the sensors and vehicle. This problem can easily be expanded to three dimensions with another accelerometer located in the Z-axes of each sensor and vehicle.

In FIG. 1 the vehicle experiences a linear acceleration and this common acceleration is observed by the accelerometers located on sensor A, sensor B and the vehicle body. The accelerometers that are attached to the vehicle body are aligned to the vehicle body reference frame. By taking the difference in acceleration data from the accelerometers on sensor A and sensor B and inputting this data in a Kalman Filter, the misalignment angle between the two sensors, $\theta sa-\theta sb$, can be computed. The same can be done between sensor A and the vehicle body, and sensor B and the vehicle body to compute all of the misalignment angles. This approach can be used to compute the three dimensional misalignment angles of roll, pitch and yaw between sensors and the vehicle body reference frame.

The same approach can be used when the vehicle is turning and each accelerometer group experiences a centripetal acceleration. However, in this case the difference in accelerations must be compensated by the centripetal acceleration resulting from the lever arm vector between the two sensors and the angular rotation of the vehicle. The angular rotation of the vehicle is sensed by a gyro triad or micro-inertial device located at the vehicle body reference frame $$A\text{comp} = A\text{sensora} - w \times w \times Rl$$

The input to the Kalman filter is now:

$$A\text{comp} - A\text{sensorb}$$

where:

Asensora is the acceleration measured by sensor A accelerometers

Asensorb is the acceleration measured by sensor B accelerometers w is the angular rotation of the vehicle measured by the ref gyros x is the cross product of two vectors Rl is the lever arm vector between sensor A and sensor B Acomp is the sensor acceleration compensated for lever arm rotation Also if the vehicle is stationary, the accelerometer groups will sense gravity and this can be used to help compute some of the misalignment angles. Information from the vehicle CAN bus, such as wheel rotation speeds are zero, will tell the Kalman filter that the vehicle is not moving and the only sensed acceleration will be from gravity.

Figure 10:
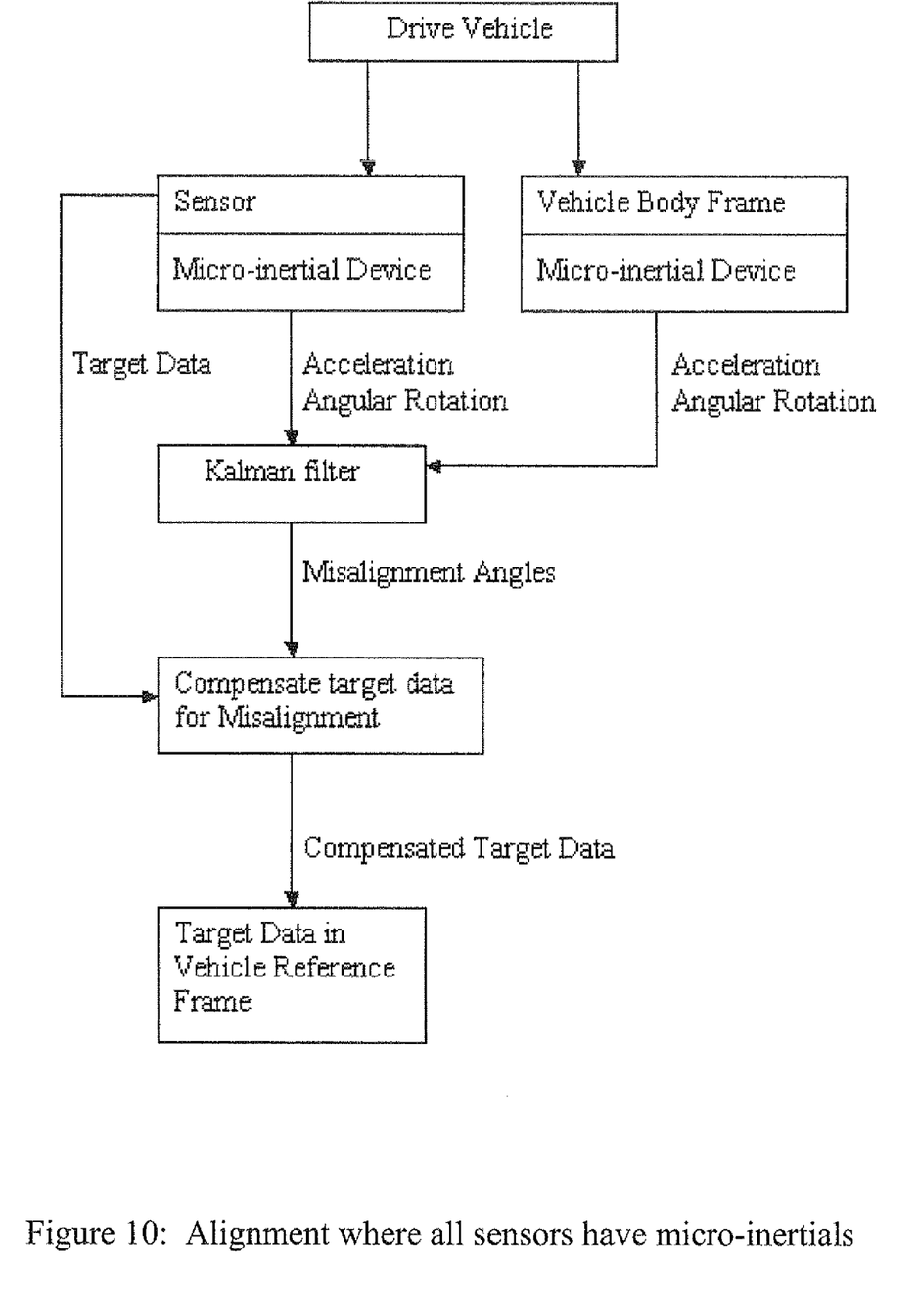
FIG. 10 is a flow chart that shows the alignment process when all sensors have micro-inertials.

FIG. 10 is a flow chart showing the process when all of the sensors, as well as the vehicle body, have a micro-inertial attached to them. When the vehicle is moving, the micro-inertials sense the angular rotation and/or acceleration of the vehicle and this information is the input to a Kalman filter. The filter uses this information to estimate the roll, pitch and yaw misalignment angles between a sensor and the vehicle body frame. These misalignment angles are then used to rotate the sensor target data into the vehicle body frame. With all of the target data in a common reference frame the processor can fuse data from several sensors into an optimal target track file.

The second method is to use accelerometers to align the sensors to each other and one of the sensors is aligned to the vehicle body by using optical information from the sensor itself. For example, acceleration data can be used to align sensor A to sensor B, but sensor B is aligned to the vehicle body directly by using sensor B to compute the misalignment angles between sensor B and the vehicle body. Since sensor A is aligned to sensor B and sensor B is aligned to the vehicle body, you can compute the misalignment between sensor A and the vehicle body. Sensor B can be a visual sensor, such as a video camera, and by observing the outline of the hood and body of the vehicle using this camera, you can compute the misalignment angles between sensor B and the vehicle body frame.

Figure 2:
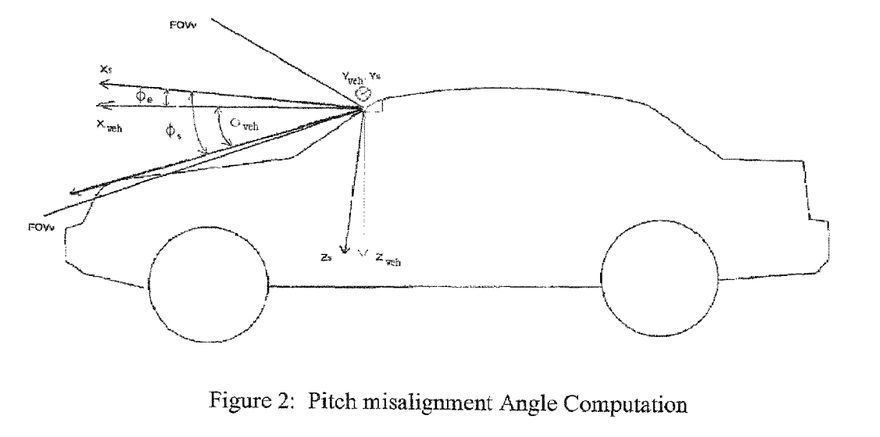
FIG. 2 is a diagram showing the pitch angles used to determine the pitch misalignment angle of the optical sensor.
Figure 5:
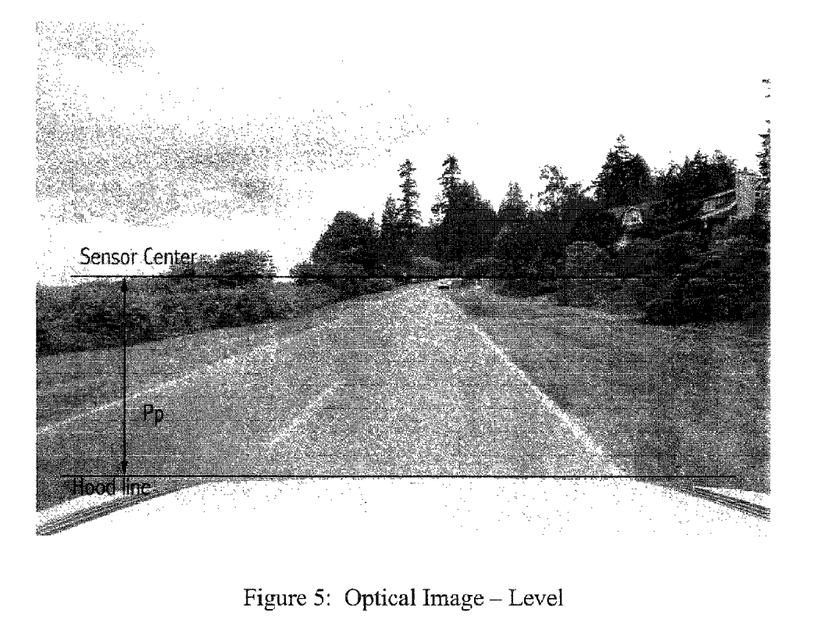
FIG. 5 is an image showing the top of the hood and how it is used to compute the pitch misalignment angle.
Figure 6:
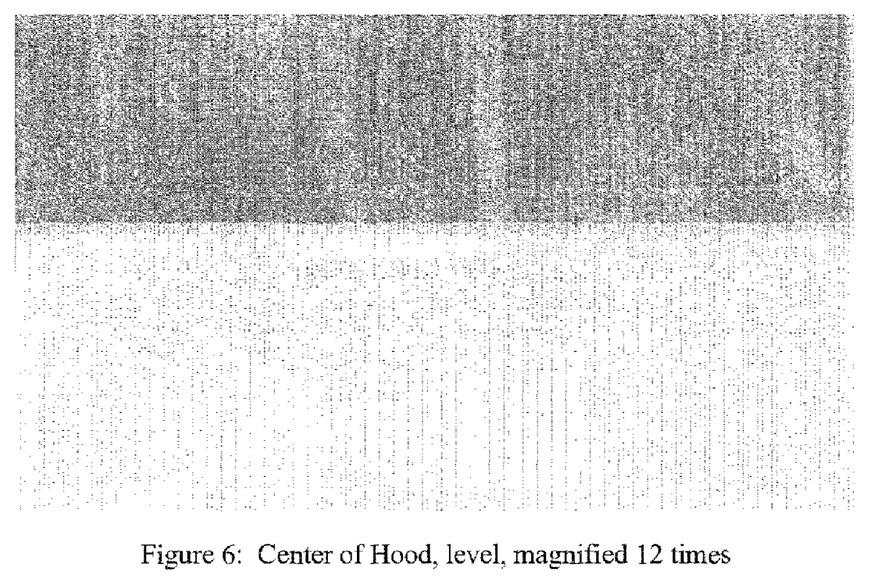
FIG. 6 is a magnified image of the hood line showing the pixels of the image.

FIG. 2 shows that the pitch misalignment angle is the angle between the sensor's X-axis and vehicle's X-axis in the vertical plane. The pitch angle between the vehicle X-axis and a line from the sensor to the top point of the hood, $\Phi$vehicle, can be computed from the vehicle's dimensions. The image from the sensor, FIG. 5 for example, shows the top of the hood. By counting the pixels from the center of the image down to the hood, Pp, the sensor pitch angle can be computed. Using a 480×640 pixel image, this angle can be computed to within 1 pixel, see FIG. 6. With a vertical field of view, FOVv, the pitch angle is:

$$\Phi s = (Pp/480) * FOVv$$

The pitch misalignment angle is:

$$\Phi\text{misalign} = \Phi s - \Phi\text{vehicle}$$

Figure 3:
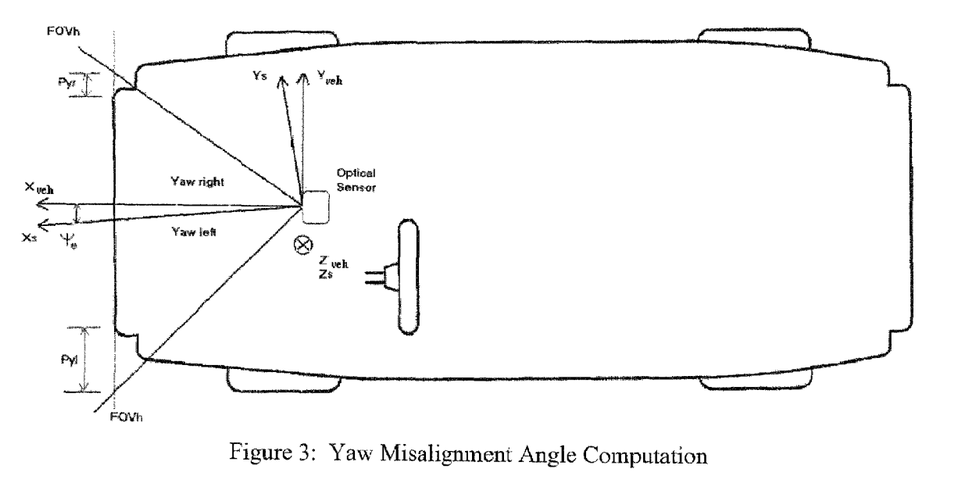
FIG. 3 is a diagram showing the yaw data that is used to determine the yaw misalignment angle of the optical sensor.
Figure 9:
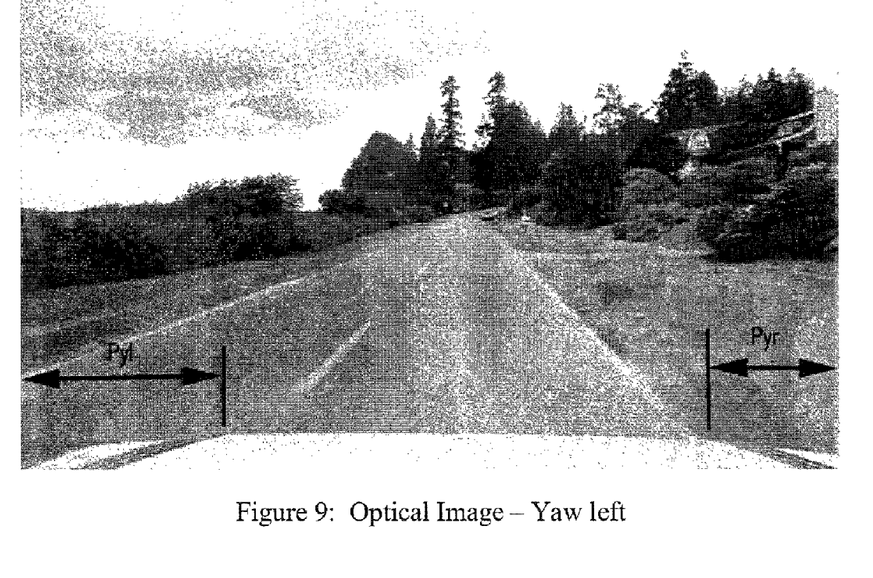
FIG. 9 is an image showing the top of the hood and how it is used to compute the yaw misalignment angle.

FIG. 3 shows that the small yaw misalignment angle is the angle between the sensor's X axis and vehicle's X axis in the horizontal plane. The sensor image shows the left and right edges of the hood, FIG. 9. By computing the pixels from the left hood edge or mark on the hood to the left of the image border, Pyl, and the right hood edge or mark to the right border, Pyr, the yaw angle of the sensor misalignment with a horizontal field of view, FOVh is:

$$\Psi\text{Misalign} = ((Pyl - Pyr)/2 * 640) * FOVh$$

Figure 4:
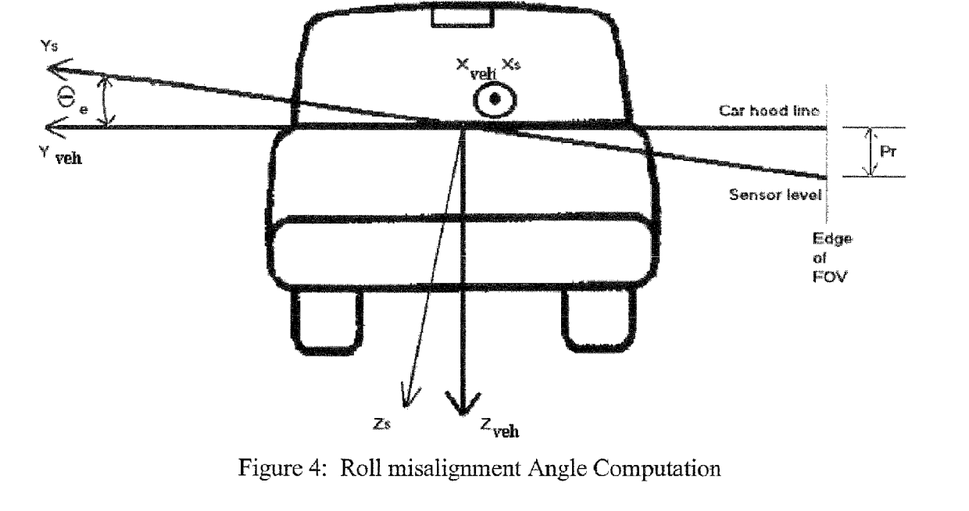
FIG. 4 is a diagram showing the roll data that is used to determine the roll misalignment angle of the optical sensor.
Figure 7:
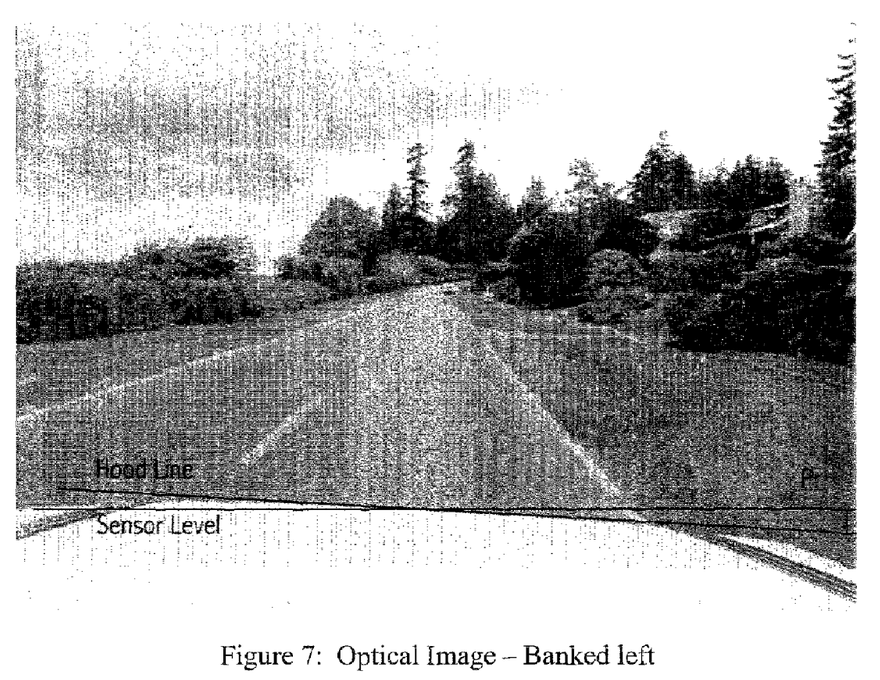
FIG. 7 is an image showing the top of the hood and how it is used to compute the roll misalignment angle.

FIG. 4 shows that the small roll misalignment angle is the angle between the sensor's Y-axis and vehicle's Y-axis in the vertical plane. The sensor image shows that the hood line and the sensor level lines cross to form the roll misalignment angle. This is shown in FIG. 7. By measuring the pixels between the two lines at the edge of the image, Pr, the roll misalignment angle can be computed as follows:

$$\Theta\text{Misalign} = (2 * Pr/640) * 180/\pi$$

Figure 8:
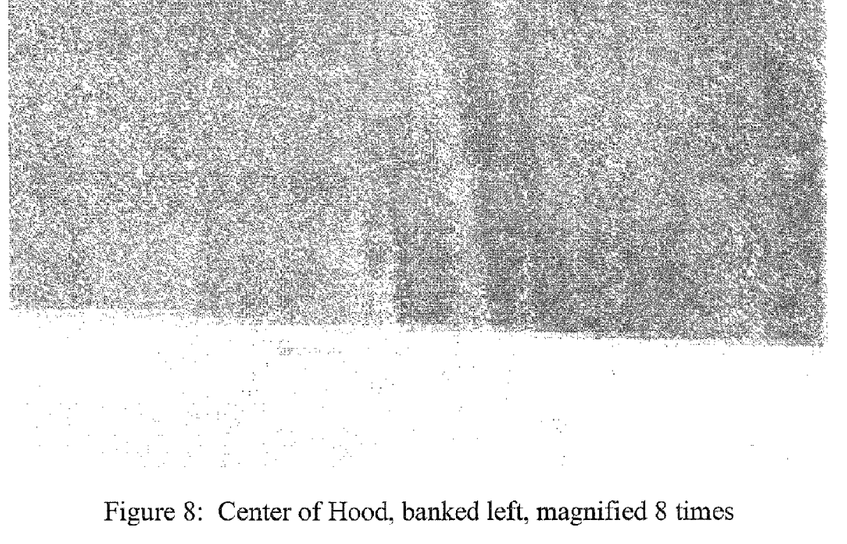
FIG. 8 is a magnified image of the banked hood line showing the pixels of the image.

FIG. 8 shows that the hood line can be determined accurately to within a couple of pixels.

Figure 11:
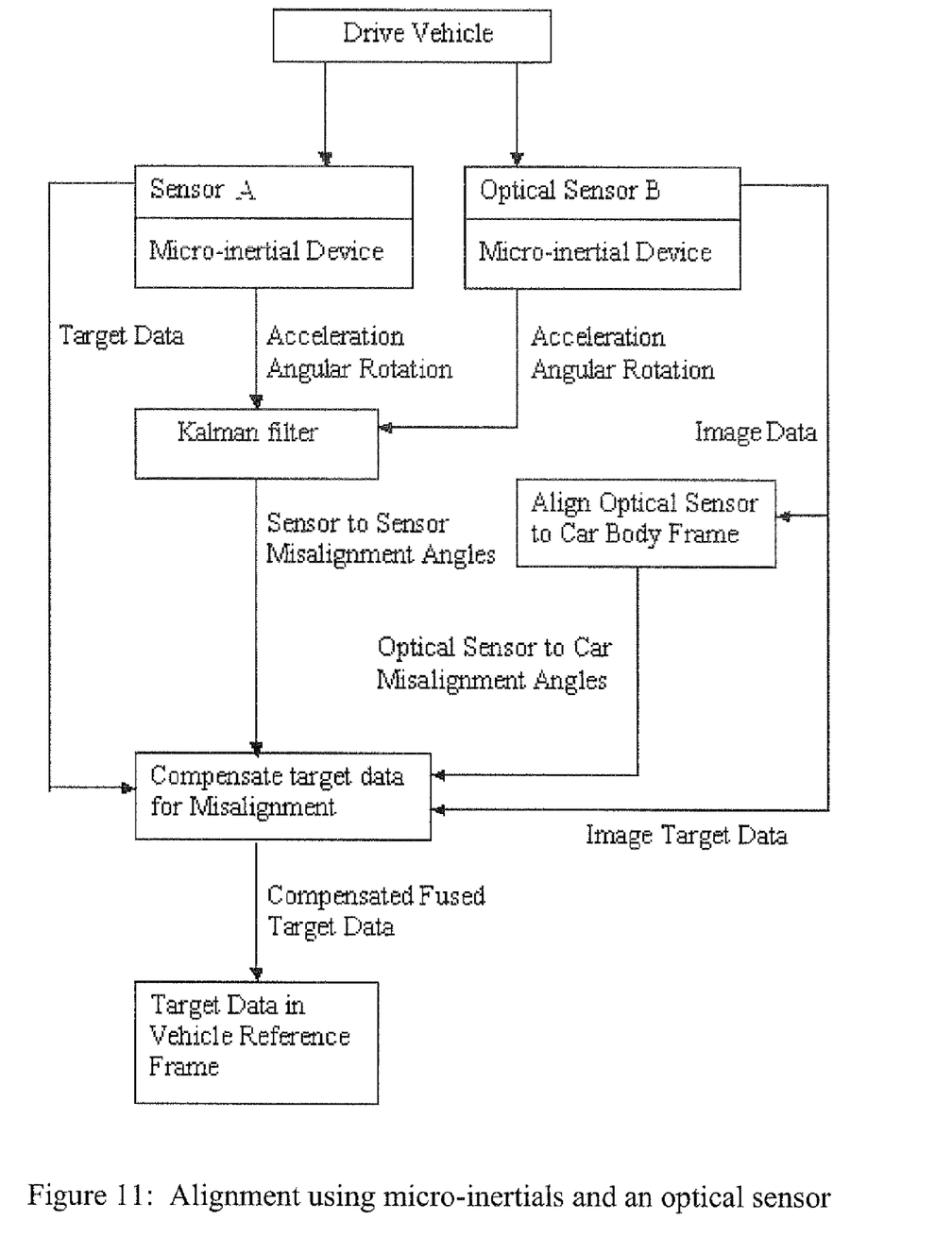
FIG. 11 is a flow chart that shows the alignment process when using micro-inertials and an optical sensor.

FIG. 11 is a flow chart showing the process when at least one of the sensors is an optical device. All of the sensors have a micro-inertial attached to them. The optical device can see the targets and the outline of features of the vehicle, such as the hood line. The optical sensor uses the hood line information to compute the roll, pitch and yaw misalignment angles between the optical sensor frame and the vehicle body frame.

When the vehicle is moving, the micro-inertials sense the angular rotation and/or acceleration of the vehicle. Like FIG. 10, the Kalman filter estimates the roll, pitch and yaw misalignment angles between a sensor frame and the optical sensor frame. These misalignment angles as well as the misalignment angles between the optical sensor and the vehicle body frame are then used to rotate all of the sensor target data into the vehicle body frame. Again, with all of the target data in a common reference frame the processor can fuse data from several sensors into an optimal target track file.

A third method is to use optical information from sensor A and sensor B to compute the misalignment between the two sensors and to use optical information from sensor B to compute the misalignment between sensor B and the vehicle body. For example, sensor A can be a ranging laser sensor and it sends out multiply beams of light to detect a target. When the light is reflected from the target, sensor B can also detect the reflected light in its video camera and using this information it can compute the misalignment between sensor A and sensor B.

Figure 12:
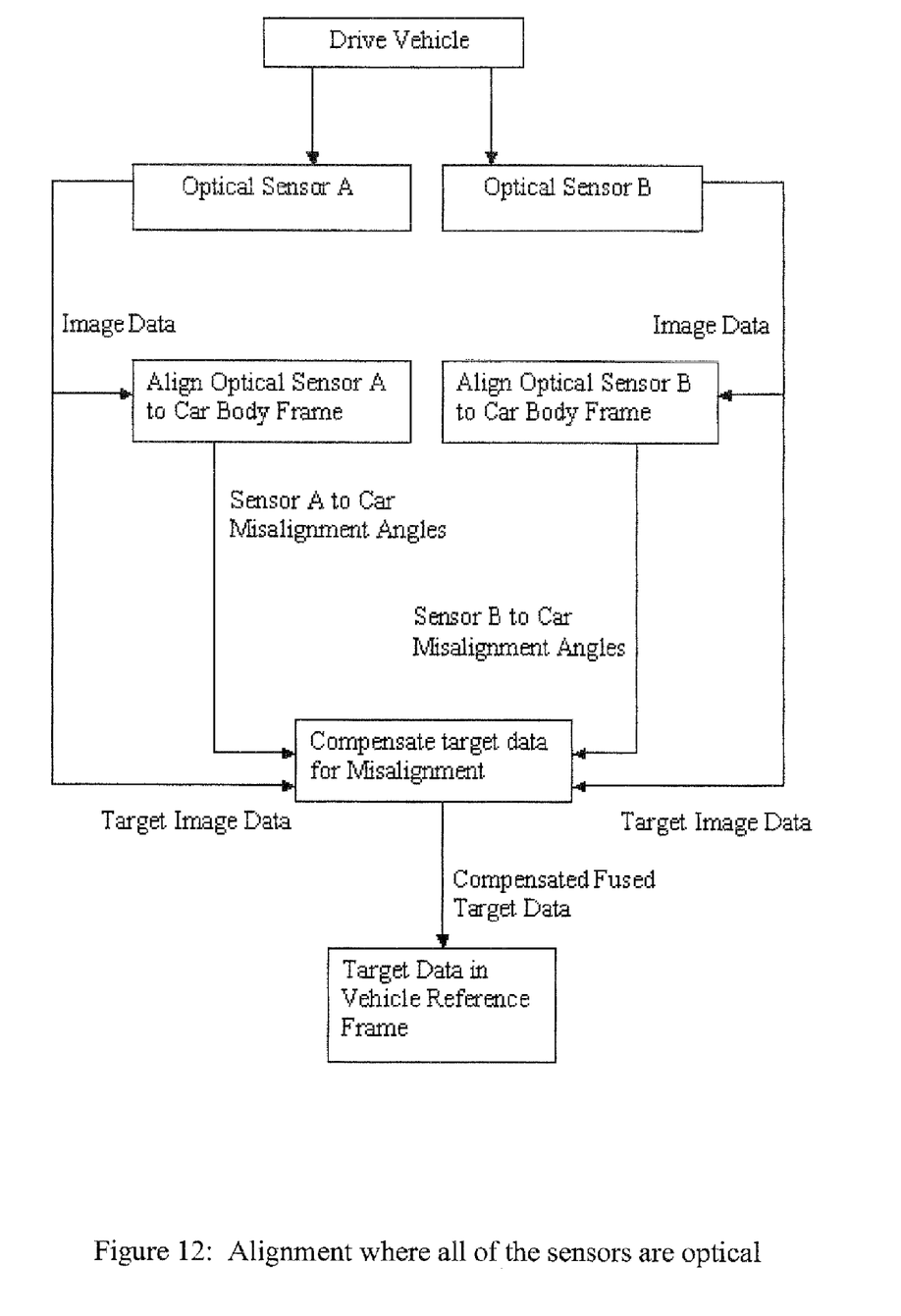
FIG. 12 is a flow chart that shows the alignment process when all of the sensors are optical.

FIG. 12 is a flow chart showing the process when all of the sensors on the vehicle are optical sensors. Each optical device can see targets and the outline of features of the vehicle, such as the hood or truck line. The optical sensors use this vehicle body information to compute the roll, pitch and yaw misalignment angles between the optical sensor frame and the vehicle body frame. These misalignment angles are then used to rotate the sensor target data from each sensor into the vehicle body frame. Like the two cases above, with all of the target data in a common reference frame the processor can fuse data from several sensors into an optimal target track file.

A fourth method is to collocate all of the sensors into one box that is mounted on the vehicle, such as the roof, so that all sensors are always aligned with respect to each other and the only alignment required is the alignment between this sensor box and the vehicle body. This can be performed by using a set of accelerometers in the sensor box and on the vehicle body frame or optically by using a video camera in the sensor box.

Figure 13:
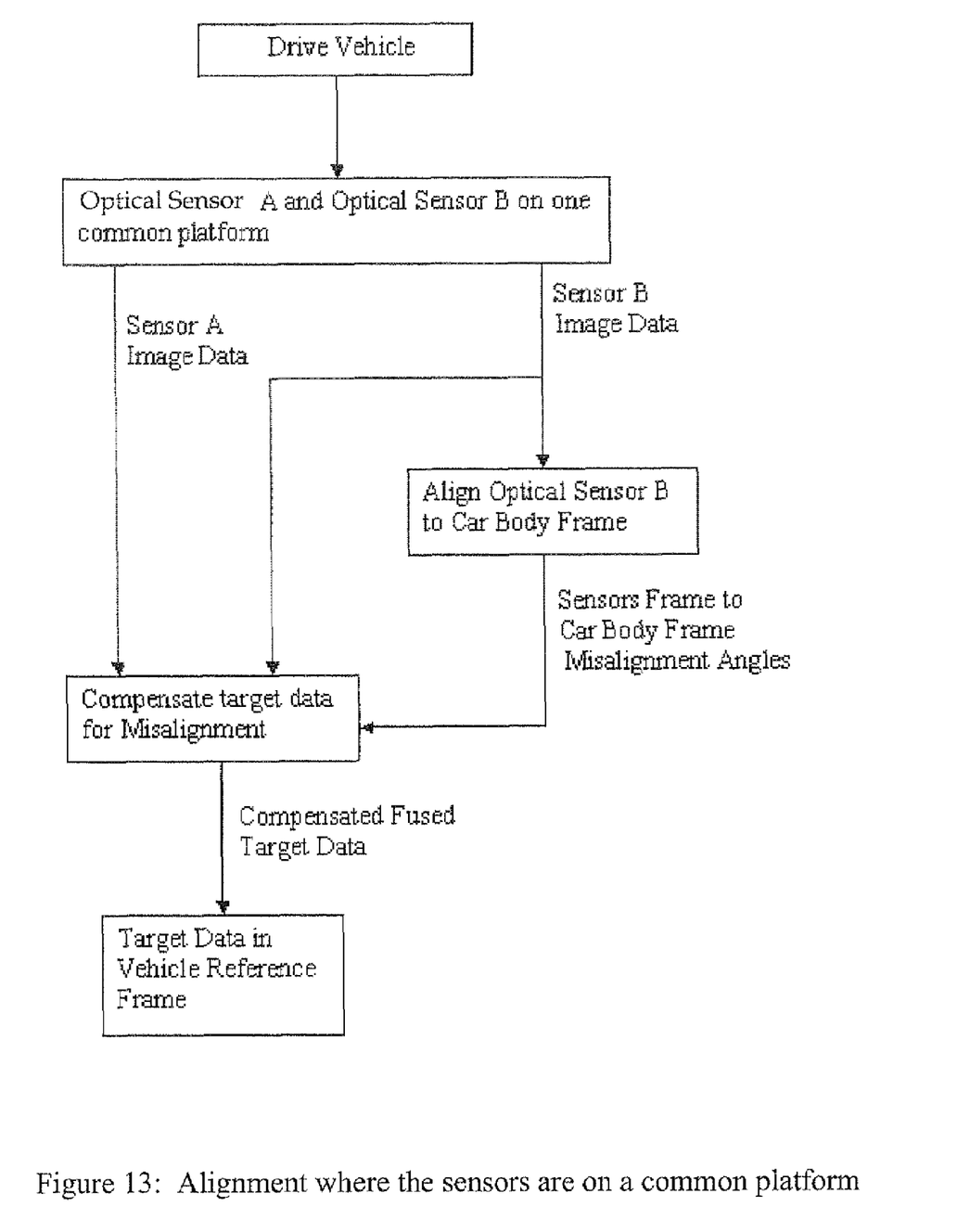
FIG. 13 is a flow chart that shows the alignment when the sensors are on a common platform.

FIG. 13 shows the case where all of the sensors are mounted onto one fixed platform. If one of the sensors is an optical sensor then it can be used to align the platform frame to the vehicle body frame as shown above. Once this set of misalignment angles is computed, then all of the target data from all of the sensors can be rotated to the common vehicle body reference frame. As shown above all of the target data is now in one reference frame for computing the optimal target tracks. If none of the sensors are optical, then a set of micro-inertials can be mounted on the common platform and also on the vehicle body. While the vehicle is moving the Kalman filter can now be used to compute the misalignment angles as discussed in the above paragraphs.

The systems described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A sensor alignment system for establishing and maintaining accurate alignment of automotive sensors comprising:
    a sensor mounted on an automotive vehicle for gathering target data around the vehicle using optical information;
    a micro inertial sensor included with the sensor that measures rotation rate and acceleration along two or more axes of the sensor for the establishment of a sensor reference frame;
    a separate micro inertial sensor independently mounted on the vehicle that measures rotation rate and acceleration along two or more axes of the vehicle for the establishment of a vehicle navigation reference frame; and
    a processor for determining an amount of misalignment of the sensor reference frame with the vehicle navigation reference frame and aligning the sensor target data with the vehicle navigation reference frame according to the amount of misalignment.

2. The system according to claim 1 wherein the processor is collocated with the sensor and the micro-inertial sensor.

3. The system according to claim 2 wherein the alignment of the sensor target data to the vehicle navigation reference frame is done at the sensor.

4. The system according to claim 1 wherein the processor is located within a vehicle system processor, which includes a micro-inertial sensor.

5. The system according to claim 4 wherein the alignment of the sensor target data to the vehicle navigation reference frame is done within the vehicle system processor.

6. The system according to claim 1 wherein multiple sensors for gathering target data around the vehicle are mounted on the vehicle, each with micro-inertial sensors that are used to determine an amount of misalignment between the multiple sensors.

7. The system according to claim 6 wherein each sensor aligns itself to the vehicle navigation reference frame in a distributed process.

8. The system according to claim 6 wherein each sensor is aligned to the vehicle navigation reference frame in a vehicle system processor in a centralized process.

9. The system according to claim 6 wherein only one of the sensors aligns itself to the vehicle navigation reference frame.

10. The system according to claim 1 wherein the sensor includes a camera.

11. The system according to claim 10 wherein the amount of misalignment is determined according to a number of pixels of an image separating two of the axes.

12. The system according to claim 1 wherein the vehicle body and a vehicle hood are used to compute the amount of misalignment.

13. The system according to claim 12 wherein the vehicle hood is used to determine one of the two or more axes of the vehicle navigation reference frame.

* * * * *